US008229664B2

(12) United States Patent
Herbert et al.

(10) Patent No.: US 8,229,664 B2
(45) Date of Patent: Jul. 24, 2012

(54) CURB DETECTION DEVICE FOR MOTOR VEHICLES

(76) Inventors: William J. Herbert, Bloomfield Hills, MI (US); Anthony Dechiara, Wadsworth, OH (US)

( * ) Notice: Subject to any disclaimer, the term of this patent is extended or adjusted under 35 U.S.C. 154(b) by 407 days.

(21) Appl. No.: 12/430,138

(22) Filed: Apr. 27, 2009

(65) Prior Publication Data

US 2009/0271114 A1 Oct. 29, 2009

Related U.S. Application Data

(60) Provisional application No. 61/125,723, filed on Apr. 28, 2008.

(51) Int. Cl.
*G06G 7/78* (2006.01)
*B60Q 1/48* (2006.01)

(52) U.S. Cl. .................................... 701/301; 340/932.2

(58) Field of Classification Search .................. 701/301; 340/932.2

See application file for complete search history.

(56) References Cited

U.S. PATENT DOCUMENTS 6,819,284 B2 * 11/2004 Maier et al. ..................... 342/70
6,999,003 B2 * 2/2006 Matsukawa et al. ....... 340/932.2
7,054,729 B2 * 5/2006 Maier et al. ..................... 701/36
2003/0058132 A1 * 3/2003 Maier et al. ................ 340/932.2
2005/0203686 A1 * 9/2005 Maier et al. ...................... 701/36
2005/0285758 A1 * 12/2005 Matsukawa et al. ....... 340/932.2
2008/0042865 A1 * 2/2008 Shephard et al. .......... 340/686.6
2009/0128364 A1 * 5/2009 Lee ........................... 340/932.2
2009/0312912 A1 * 12/2009 Braegas .......................... 701/42
2011/0260887 A1 * 10/2011 Toledo et al. ............. 340/932.2

OTHER PUBLICATIONS

Aufrère et al. "Multiple Sensor Fusion for Detecting Location of Curbs, Walls, and Barrier", 2003 IEEE 0-7803-7848-2/03 (pp. 126-131).*

Mertz et al. "Collision Warning and Sensor Data Processing in Urban Areas" (2005). Robotics Institute. Paper 64. http://repository.cmu.edu/robotics/64.*

* cited by examiner

*Primary Examiner* — Naeem Haq
(74) *Attorney, Agent, or Firm* — Raggio & Dinnin, P.C.

(57) ABSTRACT

The present invention provides parking curb detection devices and methods for alerting a motor vehicle driver when a predetermined distance from a parking curb has been reached to prevent vehicle damage. An audio and/or a visible signal device alerts the vehicle driver when the correct stopping point has been reached. The present invention utilizes a triangulation led infrared sensor, a control box with digital algorithm filtering, long wave length and bandpass optical filters, and also electronic filters to largely prevent false alerts during bright sunshine conditions.

10 Claims, 7 Drawing Sheets side view

Figure 1 - top view
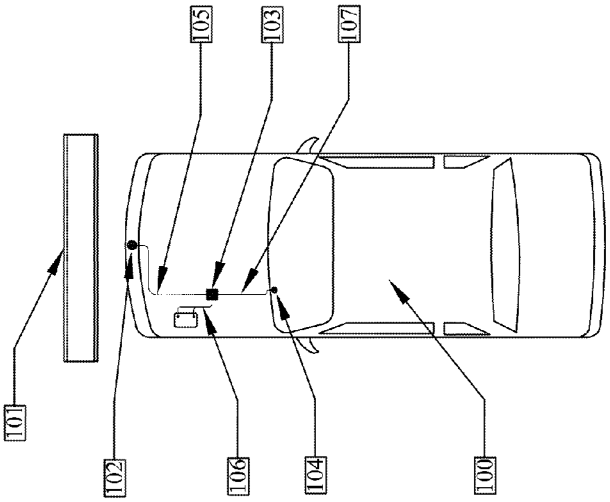
| | |
|---|---|
| 100 | Vehicle |
| 101 | Parking Curb |
| 102 | Distance Sensor Housing |
| 103 | Control Box |
| 104 | Audible and/or Visual Signal Alert Device |
| 105 | Sensor Cable to Control Box |
| 106 | Control Box to Voltage Source Connection |
| 107 | Audible and/or Visual Signal Alert Device Cable to Control Box |

Figure 2 - top view
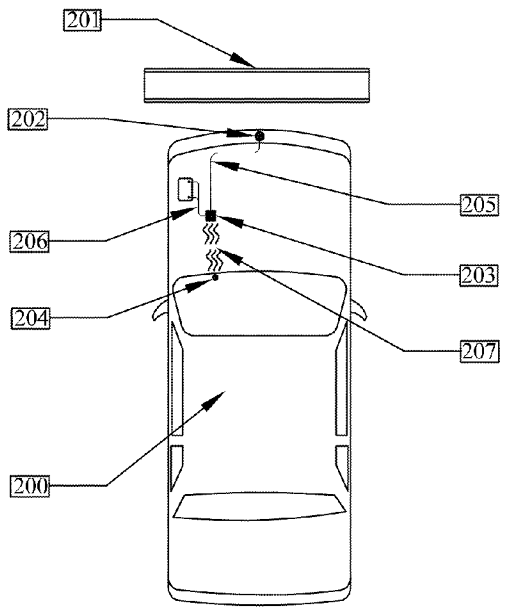
| | |
|---|---|
| 200 | Vehicle |
| 201 | Parking Curb |
| 202 | Distance Sensor Housing |
| 203 | Control Box |
| 204 | Audible and/or Visual Signal Alert Device |
| 205 | Sensor Cable to Control Box |
| 206 | Control Box to Voltage Source Connection |
| 207 | Audible and/or Visual Signal Alert Device Wireless Signal from Control Box |

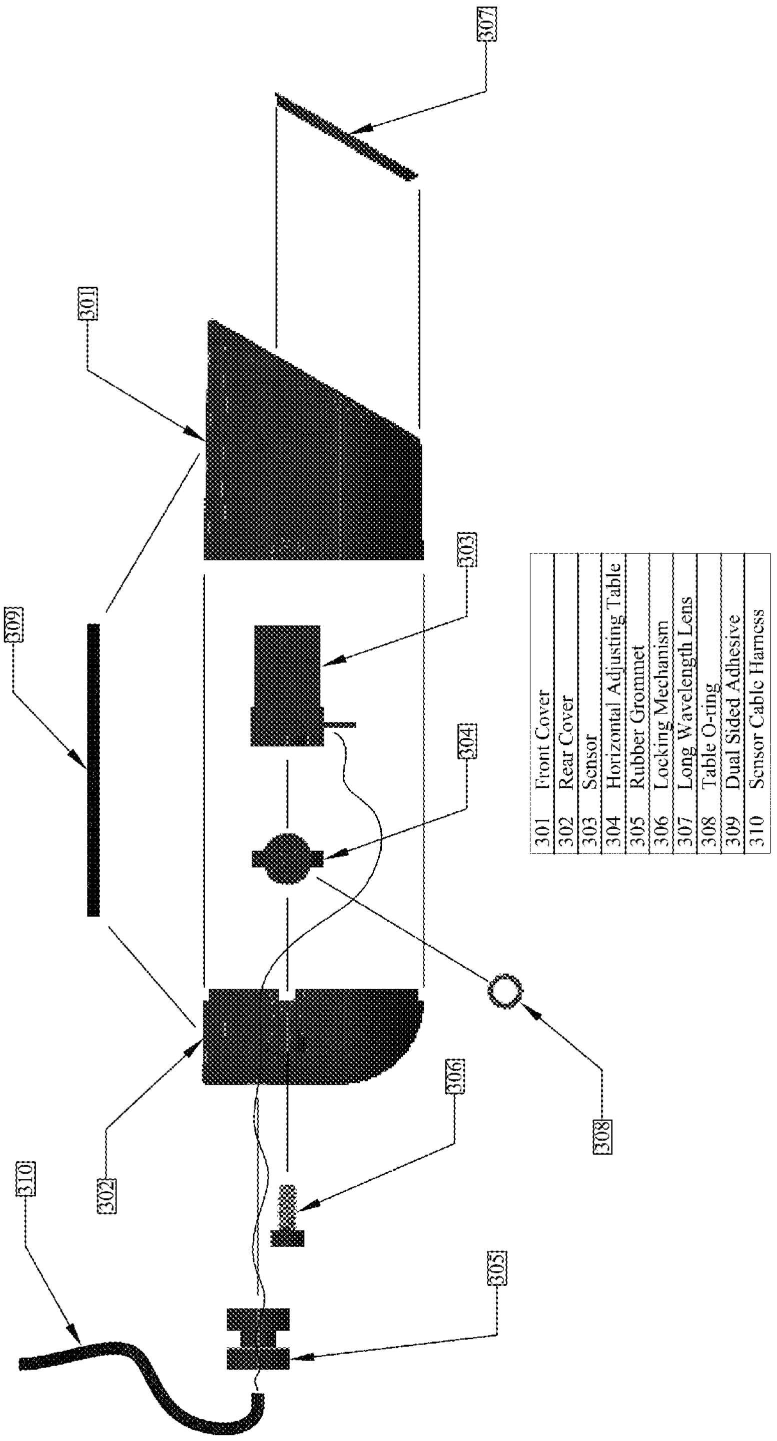
| | |
|---|---|
| 301 | Front Cover |
| 302 | Rear Cover |
| 303 | Sensor |
| 304 | Horizontal Adjusting Table |
| 305 | Rubber Grommet |
| 306 | Locking Mechanism |
| 307 | Long Wavelength Lens |
| 308 | Table O-ring |
| 309 | Dual Sided Adhesive |
| 310 | Sensor Cable Harness |
Figure 3 - side view

Figure 4 - top view
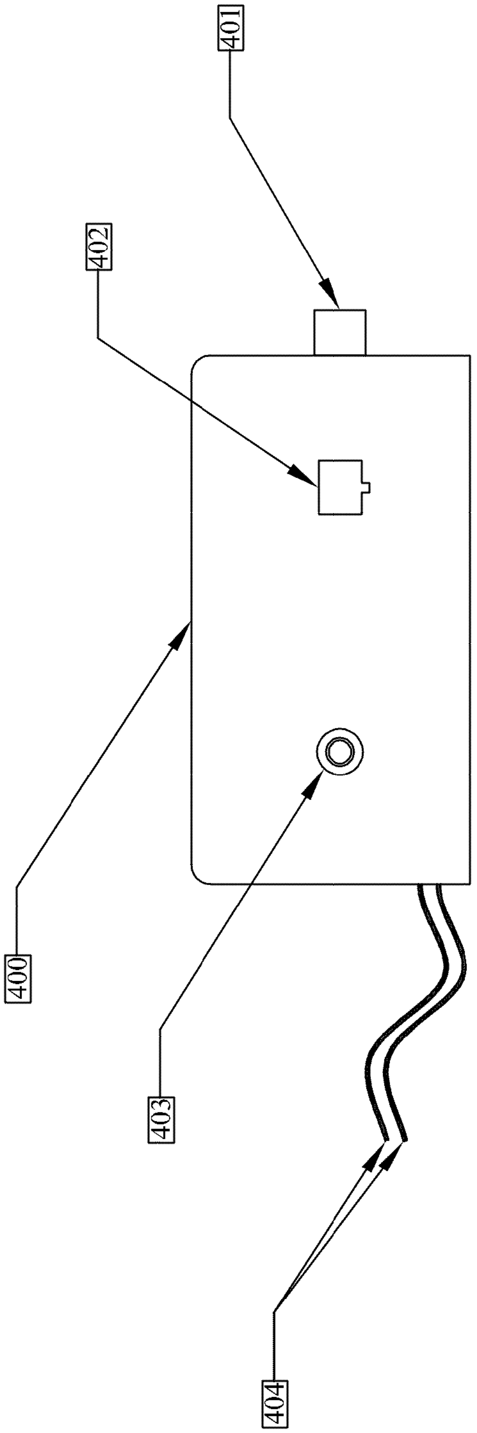
| | |
|---|---|
| 400 | Control Box |
| 401 | Distance Calibration Switch |
| 402 | Sensor Cable Receptacle |
| 403 | Audible and/or Visual Signal Alert Device Cable Receptacle |
| 404 | D.C. Power Leads |

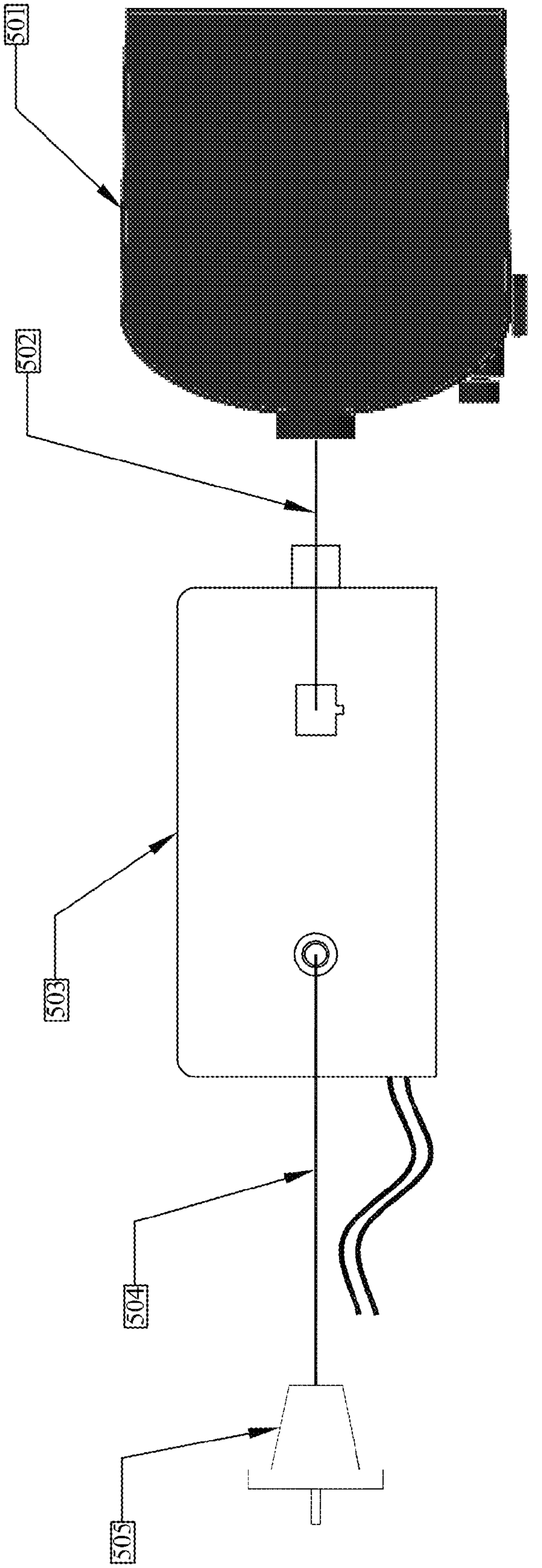
Figure 5 - top view
| | |
|---|---|
| 501 | Distance Sensor Housing |
| 502 | Sensor Cable to Control Box |
| 503 | Control Box |
| 504 | Audible and/or Visual Signal Alert Device Cable |
| 505 | Audible and/or Visual Signal Alert Device |

Figure 6 - top view
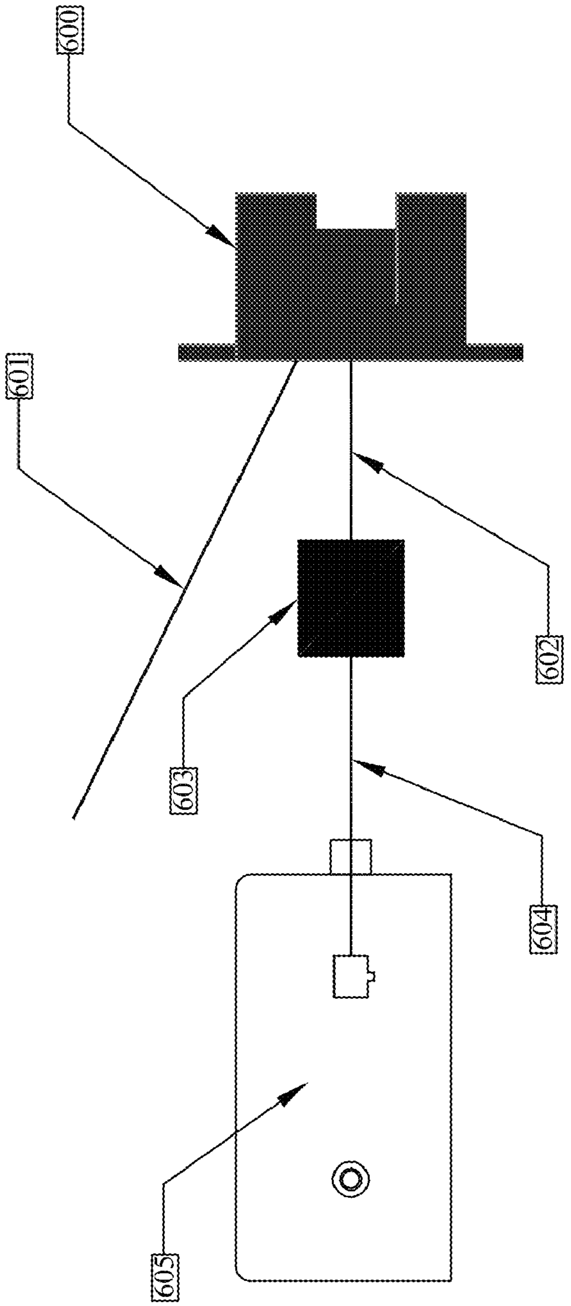
| | |
|---|---|
| 600 | Triangulating IR LED Sensor |
| 601 | Input Stabilized DC Voltage |
| 602 | Output Stabilized DC Voltage |
| 603 | Microprocessor |
| 604 | Digitally Filtered Output |
| 605 | Control Box |

Figure 7 - top view
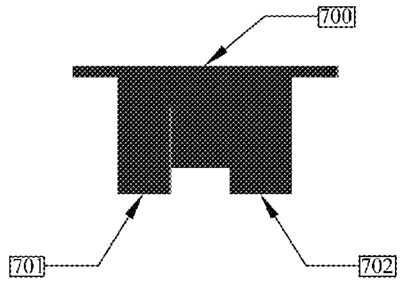
| | |
|---|---|
| 700 | Triangulating Infrared LED Sensor |
| 701 | Infrared Emitter |
| 702 | Infrared Receiver |
Figure 8 - top view
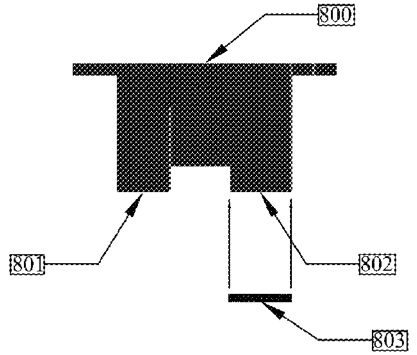
| | |
|---|---|
| 800 | Triangulating Infrared LED Sensor |
| 801 | Infrared Emitter |
| 802 | Infrared Receiver |
| 803 | Narrow Bandpass Filter |

CURB DETECTION DEVICE FOR MOTOR VEHICLES

This application claims priority from U.S. Ser. No. 61/125,723, entitled CURB DETECTION DEVICE FOR MOTOR VEHICLES, filed Apr. 28, 2008.

STATEMENT REGARDING FEDERALLY SPONSORED RESEARCH OR DEVELOPMENT

Not Applicable

BACKGROUND OF THE INVENTION

A. Field of Invention

This invention pertains to curb detection devices for motor vehicles that provide reliable signals to the vehicle driver when their vehicle has reached a pre-determined and adjustable frontal lateral distance from curbs during parking. These devices use at least a single infrared triangulation distance sensor, control box circuitry, an audible and or visible signal alert, and several anti falsing measures to warn the vehicle driver when the pre-determined distance has been reached to prevent curb damage to the vehicle. The anti falsing measures are especially useful when the curb detection device is operated in bright sunlight conditions for high reliability in preventing false signal alerts.

B. Description of the Related Art

A high number of motor vehicle drivers experience front air spoiler or front bumper damage during parking when high parking curbs are present by pulling in too far into a parking space and hitting the curb with their vehicles. While a number of object detection devices for motor vehicles exist in the prior art, very few are directed at preventing motor vehicle damage from high curbs during parking. In addition, very few, if any, of the prior art devices have been commercialized due to their accuracy limitations, complexity, device cost, false signal alerts, or high installation cost.

Accordingly, a need exists for a low cost, easily installed device with high discrimination accuracy in detecting curbs from a road surface, one which produces a very limited number of false alerts, and one that prevents curb damage during motor vehicle parking.

It is well known in the art to use a number of different sensor based devices to detect objects in the path of vehicles. These devices include laser time measurement sensors, optical sensors, electromagnetic sensors, radar sensors, ultrasonic sensors and cameras. However, all of the previous aforementioned sensor based devices have not addressed the requirements of a simple, reliable, low cost curb alerting system.

Ultrasonic sensor based systems are widely used to detect objects in the rear of a vehicle for safety and property protection. However, the inherent nature of ultrasonic sensors is to emit a relatively wide vertical and horizontal sound wave that is reflected from a detected object. Their ability to discriminate a high curb from a road surface is limited by the broad sound wave that they produce and, as a result, systems employing ultrasonic sensors will produce numerous false alerts or no alerts at all in curb detection applications.

Electromagnetic sensors require metallic content in the object that they sense and thus are not suitable for detection of concrete or asphalt curbs.

Camera based sensors are expensive, produce an image that is easily obscured by road dirt, and require the motor vehicle driver to make a judgment on whether they have pulled in far enough into the parking space. In addition, they require a vehicle driver's attention during the critical stage of parking their vehicle.

Radar based sensors use radio waves or microwaves and utilizes time measurements to measure distance. They are not well adapted to provide the discrimination necessary to distinguish a curb from a roadway surface.

Thus, for high discrimination in detecting curbs from road surfaces, only infrared led optical triangulating sensors or laser based triangulating sensors have the necessary narrow beam characteristics needed for high accuracy, reliability, and the ability to accurately discriminate between a curb and road surface.

Laser based triangulation sensors are significantly more expensive than led based infrared triangulation sensors and thus do not meet the low cost objectives of this invention. In addition, they are generally much larger in size than infrared led triangulation sensors which precludes a small, unobtrusive sensor housing size for installation on motor vehicles.

Optical sensors of the non triangulating type depend on the intensity of the light reflected from an object and, thus, are much less accurate in distance measurement. Object geometry, color, texture, and ambient light levels have a significant impact on the intensity of light reflected back to the sensor light receiver thereby significantly impacting distance accuracy measurements.

Triangulating optical sensors, which commonly use an infrared led light source, do not rely on the intensity of reflected light and, thus, are much less sensitive to object geometry, color, texture, and ambient light levels. Instead, they rely on the angle of reflection of light emitted by the sensor light source and received by the sensor's linear light sensitive receptors to determine distance.

A number of devices for vehicle object detection are known in the art:

U.S. Pat. No. 4,447,800 to Kasuya, et al discloses an infrared laser sensor that emits a light signal that is outside of the wavelength of solar light energy and is not triangulating. Kasuya does not anticipate the use of an optical triangulating sensor that emits light within the wavelength of solar light energy and functions reliably.

U.S. Pat. No. 5,701,122 to Canedy discloses the use of two pairs of optical sensor units, based on sensors disclosed by Kasuya in U.S. Pat. No. 4,447,800 for curb detection. Again, the benefits of optical triangulation sensors are absent and the use of two pairs of optical sensor units makes the invention more costly and time consuming to install. Installation of the sensors on the left and right side of the front end of the vehicle prevents detection of objects directly ahead of the vehicle center.

U.S. Pat. No. 6,812,466 discloses an infrared obstacle detection system that minimizes the effects of ambient light by measuring the magnitude of ambient light and an offset control signal to mitigate the effects of ambient light. Again, the advantages of a triangulation sensor are not used.

U.S. Pat. No. 7,518,738 to Cavallucci; Grill; et al. discloses an optical detection method determining the position of an object using two emitters of light and two receivers of light and comparing the reflected light values to determine object distance. Such a device has a number of deficiencies compared to the current invention in cost, installation, and accuracy.

U.S. Pat. No. 7,129,490 to Olson, et al. discloses a detection apparatus when the object detected is between the emitter and detector, which is not suitable for this application.

U.S. Patent Application Publication No. 20080033647 A1 to Milark; Andreas; et al. discloses at least one distance sensor for recording a predominately a lateral distance wherein the measurement reception time is modifiable by the control device. This device measures lateral distance and use a measurement reception time which is not used in the present invention.

U.S. Patent Application Publication No. 20030036881 to Remillard et al. discloses a method for detecting an object by a reflected light pulse using elapsed time for distance measurement.

U.S. Patent Application Publication No. 20030034462 to Remillard et al. discloses a system and method for determining the distance of an object by transmitting a light pulse to a polymeric reflector and measuring a time difference for distance measurement.

SUMMARY OF THE INVENTION

The present invention provides parking curb detection devices and methods for alerting a vehicle driver when a pre-determined distance from a parking curb has been reached during parking their vehicle to prevent curb damage to their vehicle. An audio and/or visual device alerts the vehicle driver when the correct stopping point has been reached.

The present invention utilizes a triangulation led infrared sensor enclosed within an exterior, weatherproof housing that is attached to the underside of the front bumper or to the air spoiler itself in the front central portion of the vehicle. The sensor housing has a horizontal height adjustment and locking mechanism to aim the emitted light from the sensor at the correct height above the road surface that corresponds to the correct curb height. The sensor housing also contains a long wavelength optical lens that is a visible light filter which transmits reflected infrared light. A sensor cable connects the sensor to a control box that provides power to the sensor and also provides the complete sensor signal control function which includes digital algorithm filtering, electrical filtering, microprocessor control of the curb detection system including activation and deactivation, and also sends the audible and/or visible signal alert to the alerting device or devices by cable or by wireless signal.

Since triangulating infrared sensors are susceptible to bright sunlight conditions causing false signals, a narrow bandpass filter, which only passes infrared light in a narrow band is also employed to reduce any false signal alerts of the curb detection device induced by bright sunlight. This bandpass filter should transmit infrared rays within a range of plus or minus fifty nanometers of the nominal wavelength of infrared light output of the sensor.

The present invention is inexpensive, easily installed, and easily used by vehicle drivers to prevent curb damage to their motor vehicle's front spoiler or bumper during parking.

Other features and advantages of the present invention will become readily apparent to those skilled in the art upon an examination of the following drawings and description of the preferred embodiments.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein:

FIG. 1 is a top view of a vehicle parked near a parking curb showing the approximate location of the sensor housing on the vehicle, the approximate location of the control box, and the approximate location of the audible and/or visual alert device and necessary electronic or electrical connections.

FIG. 2 is a top view of a vehicle parked near a parking curb showing the approximate location of the sensor housing on the vehicle, the approximate location of the control box, the approximate location of the audible and/or visual alert device and necessary component cable connections when a wireless signal is sent from the control box to the audible and/or visual signal alert device.

FIG. 3 is an exploded side view of the triangulating infrared sensor housing showing general design details including the long wavelength lens, adjusting table with sensor for horizontal adjustment, o-ring, locking mechanism for securing the horizontal position of the sensor angle, and the dual sided adhesive tape used to attach the sensor holder to the motor vehicle's front bumper.

FIG. 4 is top view of the control box illustrating the distance calibration switch, the plug receptacles for the sensor cable and the audible and/or visual signal alert devices, and the DC power leads.

FIG. 5 is a top view of the curb detection device illustrating the various device components and how they interconnect with each other.

FIG. 6 is a top view of a block diagram illustrating the digital and electronic filtering used in the curb detection device to reduce false signals.

FIG. 7 is a top view of the triangulating infrared sensor illustrating the emitter and receiver.

FIG. 8 is a top view of the triangulating infrared sensor with placement of the narrow bandpass filter placed over the sensor receiver.

DETAILED DESCRIPTION OF THE INVENTION

Referring now to the drawings wherein the showings are for purposes of illustrating a preferred embodiment of the invention only and not for purposes of limiting same;

FIG. 1, as a preferred embodiment of this invention, shows the vehicle, 100, parked at a pre-determined distance from a parking curb, 101. The distance sensor housing, 102, is shown attached to the vehicle centered under the front bumper area to provide an inconspicuous mounting location. A control box, 103, which contains the electronics, circuit board, microprocessor, and necessary electronic filters to control the curb detection device, is shown under the vehicle hood. A sensor cable, 105, is shown routed from the sensor housing, 102 to the control box, 103. The control box, 103, is shown electrically connected to a battery voltage source, 106, which must supply greater than about 13.4 volts dc, which is about the dc voltage produced by the output of the vehicle alternator, to activate the curb detection device. An audible or visual signal alert cable, 107, is routed from the control box, 103, to the signal alert device, 104, which is mounted in the vehicle interior. Since the control box, 103, must sense alternator voltage to activate the curb detection device, the curb detection device only operates when the motor vehicle is running thus preventing any drain from the battery when the motor vehicle is not running.

FIG. 2, as another preferred embodiment of this invention, shows the vehicle, 200, parked at a pre-determined distance from a parking curb, 201. The distance sensor housing, 202, is shown attached to the vehicle centered under the front bumper area to provide an inconspicuous mounting location. A control box, 203, which contains the electronics, circuit board, microprocessor, and necessary electronic filters to control the curb detection device, is shown under the vehicle hood. A sensor cable, 205, is shown routed from the sensor housing, 202, to the control box, 203. The control box, 203, is shown electrically connected to a battery voltage source, 206, which must supply greater than about 13.4 volts dc, which is the minimum dc voltage produced by the output of the vehicle alternator, to activate the curb detection device. Since the control box, 203, must sense alternator voltage to activate the curb detection device, the curb detection device only operates when the motor vehicle is running thus preventing any drain from the battery when the motor vehicle is not running. 207 illustrates a wireless connection from the control box, 205, to the signal alert device, 208, which is mounted in the vehicle interior. The wireless connection, 207, to the signal alert device, 204, greatly simplifies the installation by eliminating the necessity of routing a cable for the audible and/or visual signal alert device, 204, through the vehicle firewall or under the vehicle exterior trim in the hood to door area.

FIG. 3 illustrates a preferred embodiment for the sensor housing used in the curb detection device. It shows an exploded side view of the sensor housing. The front cover, 301, and the rear cover, 302 are joined together and enclose all other internal components. The sensor, 303, is attached to the horizontal control table, 304, to provide horizontal angle adjustment that allows the emitted light beam from the sensor to be adjusted to a specific desired height above the road surface. The horizontal control table, 304, is provided with an table o-ring, 308, to provide a water tight seal where it enters the sensor housing front cover, 301, and rear cover, 302 when they are joined. Locking screw, 306, secures the adjusted horizontal position of the horizontal control table, 304. The longwave length lens, 307, is adhesively inserted into the front cover, 301, to provide optical filtering allowing infrared light of about 75 nanometers below the wavelength of infrared light emitted from the sensor. A sensor cable, 310, enters the rear cover, 302, though a rubber grommet, 305, to provide a watertight seal and is electrically connected to the sensor to provide D.C. voltage to the sensor and also provide signal output from the sensor to the control box. Dual sided adhesive tape, 309, is applied to the tops of the rear cover, 302, and the front cover, 301, to provide a means of attachment to the underside of the vehicle bumper.

After the sensor housing is installed on a motor vehicle and all component electrical and electronic connections are made, the motor vehicle is started to activate the curb detection device. The sensor beam is then adjusted to the correct curb height by placing a detection object of the desired curb height directly in front of the curb detection device at distance of approximately 12 inches from the sensor. The horizontal adjusting table, 304, is then rotated to the highest horizontal position possible and slowly rotated down until the audible or visual alert device signals that the correct height adjustment has been obtained. If a longer distance for curb detection is desired, the detection object is placed at the desired curb detection distance from the sensor and the distance calibration switch is depressed to change the activation distance of curb sensing device. The curb height adjustment procedure is then repeated until the desired curb height is again achieved. To lock the curb height position in place, the locking mechanism, 306, is tightened fully.

FIG. 4 illustrates a preferred embodiment for the control box of the curb detection device. It is a top view of the control box, 400, illustrating the distance calibration switch, 401, the sensor cable receptacles for the sensor cable, 402, and the audible and/or visual signal alert devices cable, 403 and the DC power leads, 404. The control box, 400, which contains all electronic circuitry, including a printed circuit board, all necessary electronic devices, a microprocessor, and the necessary electronic filters is connected to a dc voltage source that will provide voltage levels at about the motor vehicle's alternator out put voltage. The control box circuitry also contains a means to provide a continuous alert to the motor vehicle driver should the sensor fail to supply output signals to it. A convenient dc voltage connection point for the power leads, 404, of the control box, 400, is the motor vehicle's battery since the battery will output dc voltage near the dc voltage output of the alternator when the motor vehicle is running. Other suitable dc voltage connection points, such as a fuse box, can also be used, as long as they output dc voltage near that of the vehicle's alternator. The battery dc voltage connection has advantages in that the battery is easily accessed, the curb sensing device is independent of all other sensitive electronic systems in the motor vehicle, and this method of control box connection allows the curb sensing device to turn on and off in conjunction with the motor vehicle's engine.

FIG. 5 is a top view of the curb detection device illustrating the various device components and how they interconnect with each other. The distance sensor housing, 501, is connected by the sensor cable to control box, 502, to the control box, 503. The audible and/or visual alert device, 505, is connected to the control box, 503, by the audible and/or visual alert cable, 504. A wireless connection from the control box, 503, to the audible and/or visual alert device, 505, as described in FIG. 2 can be used to replace the cable connection, 504, to simplify the overall curb sensing device installation.

FIG. 6 illustrates a preferred embodiment of the digital and electronic filtering used in the curb detection device. It is a top view of a block diagram illustrating the digital and electronic filtering used in the curb detection device to reduce false signals. A triangulating infrared led sensor is shown in 600. A particularly useful sensor for the curb sensing device is a Sharp triangulating distance measuring sensor, which uses a focused beam infrared emitter and a position sensitive detector. The Sharp triangulating distance measuring sensor is a reliable, sophisticated, and low cost device. However, the output from position sensitive detector is prone to noise from multiple sources that can produce false alerts. These sources include supply voltage electrical noise, reflected and ambient light, and electrical noise on the analog output of the position sensitive detector. The supply input stabilized dc voltage, 601, to the sensor, 600, is stabilized by use of an appropriate capacitor. The sensor output stabilized dc voltage, 602, is achieved with an appropriate capacitor and resistor in a parallel configuration. The microprocessor, 603, uses a digital filtering algorithm on the analog output from the position sensitive detector of the triangulating IR led sensor, 600, to provide a digitally filtered output, 604, to the control box, 605. Although various digital filtering algorithms can be used, the algorithm used is unique from any prior art. The analog output from the position sensitive detector is a proportional output that updates every 39 milliseconds. Due to the noise mentioned above the output is not stable and one reading out of the pre determined trip level was enough to "trip" the unit into the alarm condition (alerting the motor vehicle driver of a vertical obstacle in the path of the vehicle). The software filter uses a "trip level" and a "trip duration". The sample frequency of the microprocessor was first adjusted to about one millisecond, which is approximately 40 times faster than the analog output of the position sensitive detector. The "trip duration" part of the filter was defined as successive reads above the "trip" level. Regardless of how many readings occur above the "trip" level, one reading below the "trip" level will reset the duration counter to zero. This guarantees that the digital filter would only count a specific number of good readings before the logic would trigger positive and “trip” the unit into the alarm condition. In this application the logic is only concerned with the position sensitive detector output when it reaches the “trip” level. It is essential not to alarm prematurely when spurious noise causes the sensor level to momentarily go above the “trip” level. This digital filter “throws out” any bad readings and only counts the readings above a pre-determined level or threshold (referred to as the “trip” level. The “trip” duration was found to be about 300 readings over the “trip” level. Another needed function was the reset of the alarm condition. This is also important to not reset prematurely with a short duration value from the position sensitive detector output below the pre determined reset level. The same algorithm was used for resetting the alarm condition. The “reset duration” part of the filter was defined as successive reads below the “reset” level. Regardless of how many reads below the “reset” level, one reading above the “reset” level will reset the reset duration counter to zero. This guarantees that the filter will only count a specific number of good readings before the logic would trigger negative and “reset” the curb sensing unit to a non-alarm condition. The “reset” duration is about 80 readings below the “reset” level.

FIG. 7 is a front view of the triangulating infrared led sensor, 700 illustrating the infrared emitter, 701, and infrared receiver. 702.

FIG. 8 is a front view of the triangulating infrared led sensor, 800 with placement of the narrow bandpass filter, 803 placed over the infrared receiver, 802, with the infrared emitter shown in 801. The narrow bandpass filter, 803, is selected to be about 50 nanometers below and 50 nanometers above the emitted infrared wavelength from the infrared emitter, 801. This narrow bandpass filter is very selective in the wavelength that passes through to the infrared detector, 801, and significantly reduces false alerts. The narrow bandpass filter, 803, is adhesively bonded to the infrared receiver, 802.

The long wavelength lens filter used in the housing, and the narrow bandpass filter used on the triangulation infrared led sensor represent the preferred embodiment for optical filtering for the curb detection device.

We claim:

1. A curb detection device for motor vehicles that uses at least one triangulating optical distance sensor and control box circuitry to provide an audible and/or visual signal alert to the vehicle driver when the vehicle reaches a pre-determined and adjustable longitudinal distance from a parking curb to prevent vehicle damage when parking comprises:

(a) a triangulating reflected light signal distance sensor where the sensor is of an optical infrared led type;

(b) at least one horizontal angle adjustment control for the housing containing the triangulating distance sensor to adjust the height of curb detection;

(c) a means to adjust the longitudinal distance at which the curb detection device is activated by a parking curb and wherein;

(d) the curb detection device is able to distinguish a curb with a height of a minimum of 2 inches from the road surface.

2. The curb detection device of claim 1, wherein the control box circuitry activates the curb detection device only when it senses supply voltage above about 13.4 volts.

3. The curb detection device of claim 1, wherein the control box circuitry deactivates the curb detection device when it senses supply voltage above about 13.4 volts.

4. The curb detection device of claim 1, wherein the control box circuitry automatically detects any sensor failure and provides a continuous audible and/or visible signal alert to the vehicle driver of that condition.

5. The curb detection device for motor vehicles of claim 1, wherein the curb detection device utilizes the following to largely eliminate false signal generation:

(a) digital algorithmic filtering by a microprocessor in the control box circuitry;

(b) optical filtering;

(c) electrical signal filtering at the sensor or within the control box circuitry.

6. The curb detection device for motor vehicles of claim 5, wherein digital algorithmic filtering in the control box circuitry is used to reduce false alerts, the filtering consists of digitally filtering the output from the sensor receiver at a pre-defined “trip level” that will trigger the device’s audible and/or visible alert, the trip level requires about 300 consecutive readings, each of which must be above the established “trip level” to trigger an alert, to reset to the alert ready condition, about 80 consecutive readings below the “trip level” must occur.

7. The curb detection device for motor vehicles of claim 5, wherein a long wavelength optical lens filters light below about 75 nanometers of the wavelength of light emitted from the sensor and is used to block visible and infrared light to the sensor detector through the housing lens to reduce false signal alerts.

8. The curb detection device for motor vehicles of claim 5, wherein the narrow bandpass optical filter is applied to the triangulating infrared sensor detector and allows only light from about 50 nanometers in wavelength below and about 50 nanometers in wavelength above the wavelength of light emitted from the sensor to reach the infrared sensor detector to reduce false signal alerts.

9. The curb detection device for motor vehicles of claim 5, wherein electrical filtering in the control box circuitry and/or sensor is used to reduce false signal alerts.

10. The curb detection device of claim 1 wherein the audio and or visible signal alert is transmitted using a wireless connection from the control box to the audio and/or visible signal alert devices.

* * * * *